US008862160B2

(12) United States Patent
Laroia et al.

(10) Patent No.: US 8,862,160 B2
(45) Date of Patent: Oct. 14, 2014

(54) METHOD AND APPARATUS FOR PAGING TERMINALS IN AN OFDM SYSTEM FOR ACHIEVING BOTH FAST PAGING RESPONSE AND LOW POWER CONSUMPTION BY UTILIZING A MULTI-STEP PAGING PROCESS

(75) Inventors: Rajiv Laroia, Far Hills, NJ (US); Junyi Li, Bedminster, NJ (US); Sathyadev Venkata Uppala, Whitehouse Station, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1661 days.

(21) Appl. No.: 11/487,118

(22) Filed: Jul. 14, 2006

(65) Prior Publication Data
US 2008/0014969 A1 Jan. 17, 2008

(51) Int. Cl.
*H04W 68/00* (2009.01)
*H04W 68/02* (2009.01)

(52) U.S. Cl.
CPC ............ *H04W 68/025* (2013.01); *H04W 68/00* (2013.01); *H04W 68/02* (2013.01)
USPC ..... 455/458; 455/412.2; 455/420; 455/422.1; 455/436; 455/466; 455/509; 455/522; 455/561; 455/574; 455/456.1; 370/252; 370/310.2; 370/311; 370/322; 370/338; 370/329; 370/331

(58) Field of Classification Search
CPC .... H04W 68/00; H04W 68/02; H04W 68/025
USPC ................ 455/426.1, 458, 434, 412.1, 412.2, 455/414.1, 418–420, 422.1, 423, 436, 437, 455/438, 450, 464, 435.2, 466, 509, 522, 455/561, 574; 370/335, 342, 319, 344, 208, 370/259, 312, 252, 310.2, 311, 322, 328, 370/329, 331, 338, 341, 348, 432, 437; 375/260
See application file for complete search history.

(56) References Cited

U.S. PATENT DOCUMENTS

| 7,206,331 B2 * | 4/2007 | Zhu et al. ...................... 375/130 |
| 7,509,135 B2 * | 3/2009 | Kim et al. ..................... 455/466 |

(Continued)

FOREIGN PATENT DOCUMENTS

| EP | 1471760 | 10/2004 |
| JP | 2004328772 | 11/2004 |
| JP | 2008505591 | 2/2008 |

OTHER PUBLICATIONS

International Search Report—PCT/US07/073511, International Search Authority—European Patent Office—Dec. 28, 2007.
Taiwan Search Report—TW096125921—TIPO—Jun. 19, 2011.

(Continued)

*Primary Examiner* — Babar Sarwar
(74) *Attorney, Agent, or Firm* — John J. Ketchum

(57) ABSTRACT

Techniques for paging terminals in a wireless (e.g., OFDMA) communication system to achieve both fast paging response and low power consumption for the terminals are described. A terminal receives paging indicator from a base station. If the paging indicator indicates that the terminal is potentially being paged, then the terminal receives at least one paging message from a paging channel. The terminal determines whether any one of the at least one paging message is for the terminal e.g., based on identification information included in each paging message. If a paging message indicates that the terminal is paged, then the terminal sends an acknowledgement for the paging message. The base station may estimate the timing of the terminal based on the acknowledgement and may send timing adjustment to the terminal. The terminal may adjust its timing based on the timing adjustment and may be able to quickly access the system with no contention.

50 Claims, 10 Drawing Sheets

(56) References Cited

U.S. PATENT DOCUMENTS

2005/0064880 A1    3/2005  Butler et al.
2005/0277429 A1*  12/2005  Laroia et al. .................. 455/458

OTHER PUBLICATIONS

Written Opinion—PCT/US2007/073511, International Search Authority, European Patent Office, Dec. 28, 2007.

* cited by examiner

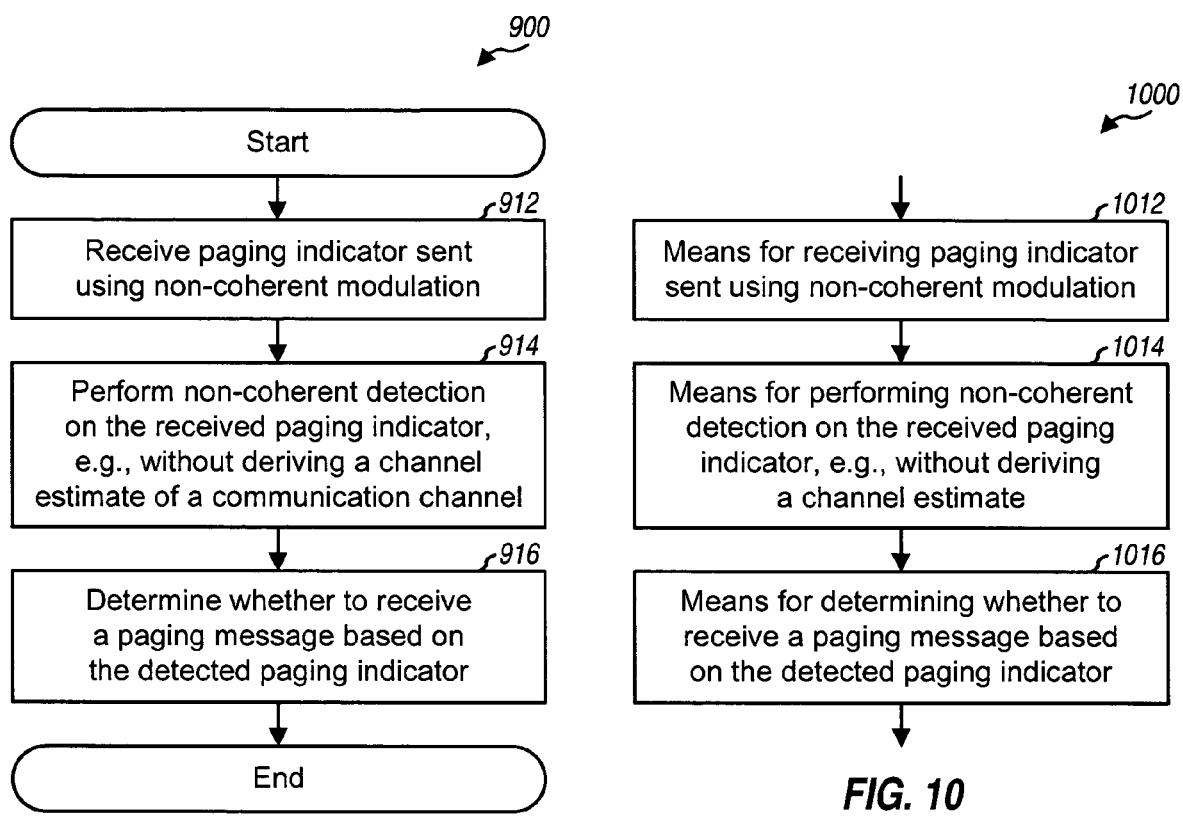

METHOD AND APPARATUS FOR PAGING TERMINALS IN AN OFDM SYSTEM FOR ACHIEVING BOTH FAST PAGING RESPONSE AND LOW POWER CONSUMPTION BY UTILIZING A MULTI-STEP PAGING PROCESS

BACKGROUND

I. Field

The present disclosure relates generally to communication, and more specifically to techniques for paging terminals in a wireless communication system.

II. Background

A terminal in a wireless communication system (e.g., a cellular phone in a cellular system) may operate in one of several states, such as active and sleep states, at any given moment. In the active state, the terminal may actively exchange data with one or more base stations, e.g., for a voice or data call. In the sleep state, the terminal may be powered down much of the time to conserve battery power and may periodically monitor a paging channel for paging messages sent to the terminal. These paging messages may alert the terminal to the presence of an incoming call or provide other information.

The terminal may be portable and powered by an internal battery. In this case, it is desirable to reduce power consumption while in the sleep state in order to extend both standby time between battery recharges and talk time when a call is made. Lower power consumption may be achieved by sending paging messages in designated paging intervals that are spaced far apart in time, which then allows the terminal to power down for a large percentage of the time. However, sending paging messages at an infrequent rate may result in a long response time to page the terminal. For example, if an incoming call is received right after one paging interval, then the system would need to wait until the next paging interval, which may be far away, before the system can page the terminal. This long paging response may be undesirable or unacceptable for some applications requiring fast response time, such as push-to-talk, instant messaging, and so on.

There is therefore a need in the art for paging techniques that can achieve both fast paging response and low power consumption for terminals.

SUMMARY

Techniques for paging terminals in a wireless communication system to achieve both fast paging response and low power consumption are described herein. In an aspect, paging is achieved with a multi-step paging process that utilizes paging indicator, paging messages, and paging acknowledgements. The paging indicator indicates whether terminals might be paged and should thus receive paging messages in an upcoming paging interval. The paging messages identify the terminals being paged and may carry basic information, e.g., identification information used to identify the paged terminals and information indicating actions to be performed by the paged terminals. The paging acknowledgements serve to acknowledge receipt of the paging messages and, if applicable, to initiate access of the system. The paging indicator, paging messages, and paging acknowledgements may be efficiently sent as described below.

In an embodiment, a terminal receives paging indicator from a base station in a wireless communication system, e.g., an OFDMA system. If the paging indicator indicates that the terminal is potentially being paged, then the terminal receives at least one paging message from a paging channel. The terminal determines whether any one of the at least one paging message is for the terminal, e.g., based on the identification information included in each paging message. If a paging message is for the terminal, which indicates that the terminal is paged, then the terminal sends an acknowledgement for the paging message. The acknowledgement may be sent with a non-contention channel resource, which is reserved for use by only the paged terminal. The base station may estimate the timing of the terminal based on the acknowledgement and may send timing adjustment to the terminal. The terminal may adjust its timing based on the timing adjustment and may be able to quickly access the system. The terminal may receive additional paging information, e.g., through traffic and/or control channels after the terminal migrates to an active state of the system.

Various aspects and embodiments of the invention are described in further detail below.

BRIEF DESCRIPTION OF THE DRAWINGS

Aspects of embodiments of the invention will become more apparent from the detailed description set forth below when taken in conjunction with the drawings in which like reference characters identify correspondingly throughout.

FIG. 9 shows a process to receive paging indicator.

FIG. 10 shows an apparatus to receive paging indicator.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
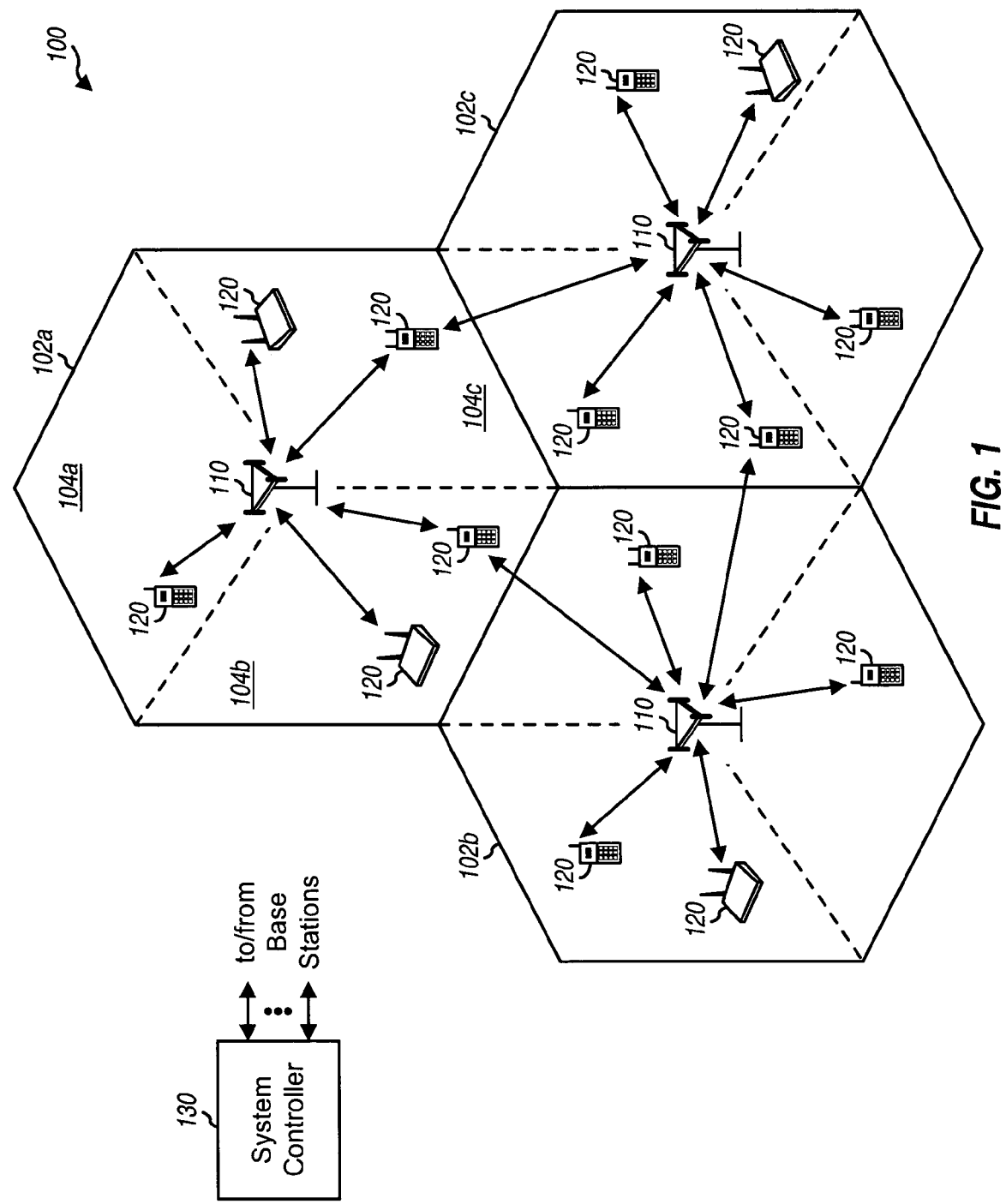
FIG. 1 shows a wireless communication system.

FIG. 1 shows a wireless communication system 100 with multiple base stations 110 and multiple terminals 120. A base station is a station that communicates with the terminals. A base station may also be called, and may contain some or all of the functionality of, a Node B, an access point, and/or some other network entity. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. Each smaller area may be served by a respective base station sector (BSS), which may also be referred to as a base transceiver subsystem (BTS). The term "sector" can refer to a BSS and/or its coverage area depending on the context in which the term is used. For a sectorized cell, the BSSs for all sectors of that cell are typically co-located within the base station for the cell. The paging techniques described herein may be used for systems with sectorized cells as well as systems with un-sectorized cells. In the following description, the term "base station" generically refers to a station that serves a cell as well as a station that serves a sector.

For a centralized architecture, a system controller 130 couples to base stations 110 and provides coordination and control for these base stations. System controller 130 may be a single network entity or a collection of network entities. System controller 130 may also be called, and may contain some or all of the functionality of, a base station controller (BSC), a mobile switching center (MSC), a radio network controller (RNC), and/or some other network entity. For a distributed architecture, the base stations may communicate with one another as needed.

Terminals 120 may be dispersed throughout the system, and each terminal may be stationary or mobile. A terminal may also be called, and may contain some or all of the functionality of, a wireless terminal (WT), an access terminal (AT), a mobile station (MS), a user equipment (UE), a subscriber station and/or some other entity. A terminal may be a wireless device, a cellular phone, a personal digital assistant (PDA), a wireless modem, a handheld device, and so on. A terminal may communicate with one or more base stations via transmissions on the downlink and uplink. The downlink (or forward link) refers to the communication link from the base stations to the terminals, and the uplink (or reverse link) refers to the communication link from the terminals to the base stations.

The paging techniques described herein may be used for various wireless communication systems. These techniques may also be used for various radio technologies and multiple-access schemes such as Code Division Multiple Access (CDMA), Time Division Multiple Access (TDMA), Frequency Division Multiple Access (FDMA), Orthogonal FDMA (OFDMA), Flash-OFDM®, and Single-Carrier FDMA (SC-FDMA). OFDMA and SC-FDMA partition a frequency band (e.g., the system bandwidth) into multiple orthogonal tones, which are also called subcarriers, subbands, bins, and so on. Each tone may be modulated with data. In general, modulation symbols are sent in the frequency domain with OFDMA and in the time domain with SC-FDMA. The techniques may also be used for wireless communication systems that utilize a combination of multiple-access schemes, e.g., OFDMA and CDMA.

Figure 2:
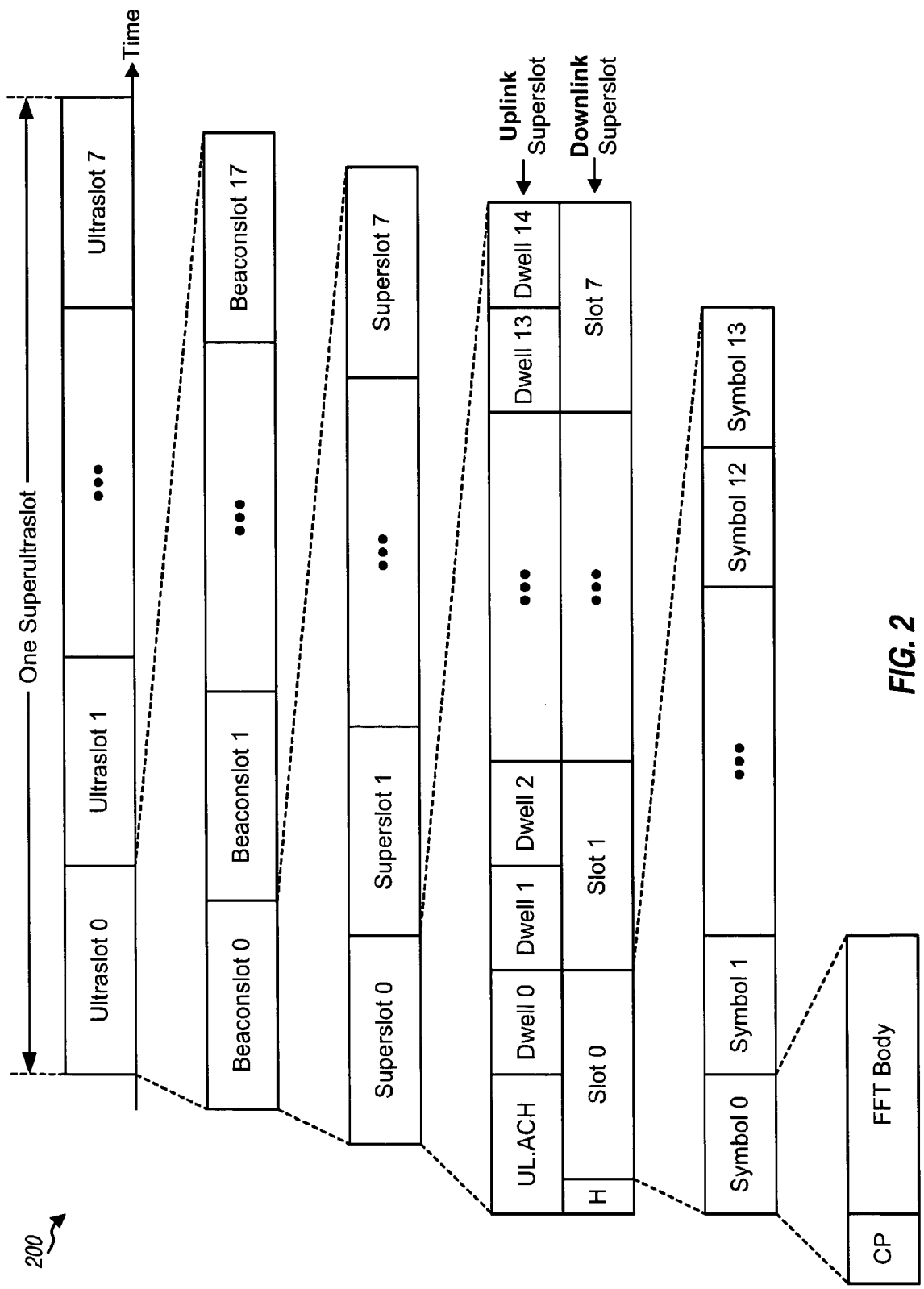
FIG. 2 shows an exemplary signal structure.

For clarity, the paging techniques are specifically described below for an exemplary OFDMA system. In general, the OFDMA system may utilize any tone structure with any number of (K) total tones and any number of usable tones. An OFDM symbol may be generated by (1) mapping modulation symbols onto tones used for transmission, (2) mapping zero symbols (with signal values of zero) onto tones not used for transmission, (3) performing a K-point inverse fast Fourier transform (IFFT) on the modulation symbols and zero symbols to obtain an FFT body with K time-domain samples, and (4) copying the last C samples of the FFT body to the start of the FFT body to form an OFDM symbol with K+C samples, as shown in FIG. 2. The C copied samples are called a cyclic prefix or a guard interval and are used to combat intersymbol interference (ISI) caused by frequency selective fading.

In a specific embodiment, the OFDMA system utilizes a tone structure with K=128 total tones and 113 usable tones. In an embodiment, C=16, and each OFDM symbol has 144 samples that are sent in 144 sample periods. An OFDM symbol period (or simply, a symbol period) is the duration of one OFDM symbol and is equal to 144 sample periods.

The paging techniques described herein may be used with various signal structures for the downlink and uplink. A signal structure indicates the manner in which data and signaling are sent on each of the downlink and uplink. For clarity, an exemplary signal structure for the downlink and uplink is described below.

FIG. 2 shows an embodiment of a signal structure 200. The timeline for transmission is divided into superultraslots. Each superultraslot has a predetermined time duration (e.g., around 13.1 seconds) and includes eight ultraslots with indices 0 through 7. Each ultraslot includes 18 beaconslots with indices 0 through 17, and each beaconslot includes eight superslots with indices 0 through 7.

For the downlink, each superslot includes a header (H) followed by eight slots with indices 0 through 7. The superslot header spans two symbol periods, each slot spans 14 symbol periods, and each superslot spans 114 symbol periods. A base station may transmit traffic data, signaling, and/or pilot in each symbol period of each slot. For the uplink, each superslot includes an uplink access channel (UL.ACH) followed by 15 dwells with indices 0 through 14. The ULACH spans 9 symbol periods, each dwell spans 7 symbol periods, and each superslot spans 114 symbol periods. One or more terminals may transmit traffic data, signaling, and/or pilot in each symbol period of each dwell.

FIG. 2 shows a specific signal structure for the downlink and uplink. Various other signal structures may also be used, and this is within the scope of the present invention. For clarity, the paging techniques are described below for the signal structure shown in FIG. 2.

A terminal may operate in one of multiple states at any given moment. The states may also be referred to as Medium Access Control (MAC) states, operating modes, and so on.

Figure 3:
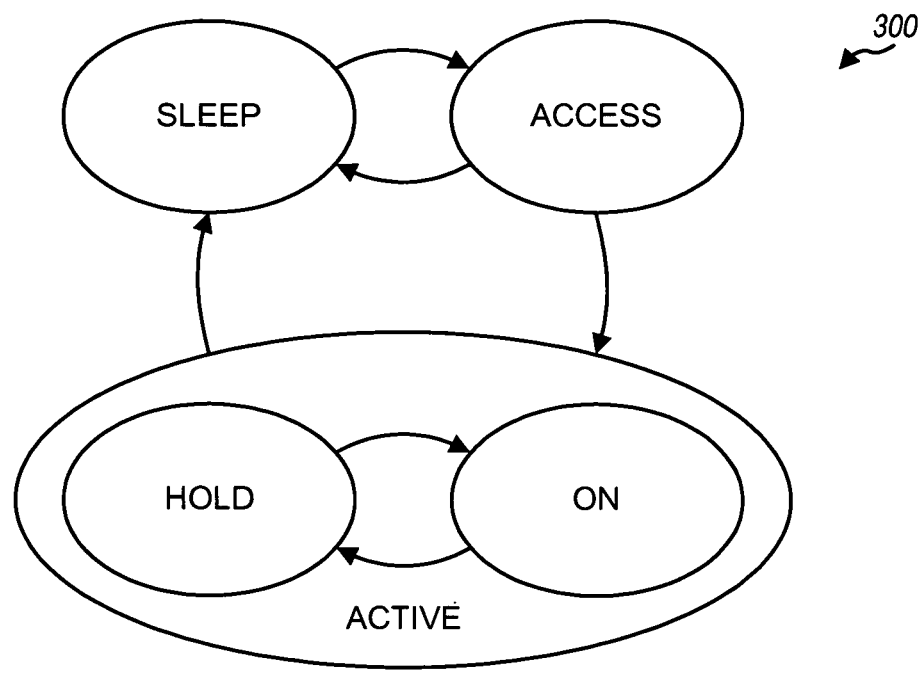
FIG. 3 shows an exemplary state diagram for a terminal.

FIG. 3 shows an embodiment of a state diagram 300 for a terminal. In this embodiment, the supported states include an ON state, a HOLD state, a SLEEP state, and an ACCESS state. The ON state and HOLD state may be considered as substates of an ACTIVE state. In the ON state, the terminal can receive data on the downlink and/or transmit data on the uplink. In the HOLD state, the terminal can receive data on the downlink but is not able to transmit data on the uplink. In an embodiment, while in the HOLD state, certain parameters (e.g., timing and transmit power) of the terminal are controlled such that the terminal can quickly transition to the ON state. In the SLEEP state, the terminal is powered down much of the time to conserve battery power. While in the SLEEP state, the terminal may be paged by the system, e.g., for an incoming call or some other reason. The terminal may transition from the SLEEP state to the ACCESS state to access the system, e.g., to initiate communication or to respond to a page. In the ACCESS state, the terminal may perform an access procedure to attempt to access the system. In general, a state diagram may have any number of states, and the states may be defined in various manners.

In an aspect, the paging of terminals in the OFDMA system is achieved with a multi-step paging process that can achieve both fast paging response and low power consumption by the terminals to receive pages. In an embodiment, the multi-step paging process utilizes the following components:

Paging indicator—indicates whether terminals might be paged and should thus receive paging messages in an upcoming paging interval, Paging messages—identify specific terminals being paged and carry basic information, e.g., identification information and paging format, Paging acknowledgements—serve to acknowledge receipt of paging messages and, if applicable, to initiate access of the system, and Signaling/traffic—used to convey additional paging information, if applicable.

In general, the multi-step paging process may utilize any number of components and any combination of components to facilitate paging of terminals. Furthermore, each component may serve different functions than those noted above. For clarity, the paging techniques are described for the components given above. Also for clarity, much of the description below is for paging from the perspective of one terminal.

Figure 4:
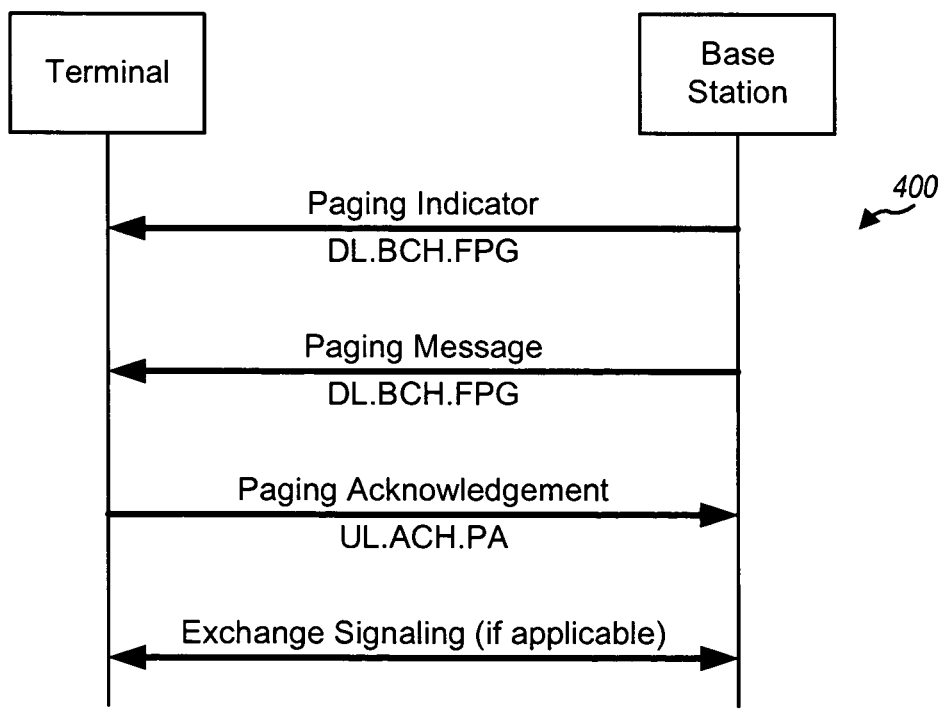
FIG. 4 shows a paging operation for the terminal.

FIG. 4 shows an embodiment of a paging operation 400 for the terminal, which is in the SLEEP state. The terminal receives paging indicator sent by a base station on a downlink broadcast flash paging channel (DL.BCH.FPG). The paging indicator is sent in a manner such that the terminal can quickly determine whether the terminal might be paged. If the paging indicator indicates that the terminal is not paged, then the terminal may go back to sleep after receiving the paging indicator. Otherwise, the terminal receives at least one paging message on a downlink paging channel (DL.PCH). In an embodiment, each paging message carries basic information such as, e.g., identification information and paging message format/type. The terminal may go back to sleep if none of the paging message(s) is for the terminal. However, if a paging message is for the terminal, then the terminal sends a paging acknowledgement on an uplink access channel's paging acknowledgement segment (UL.ACH.PA). The paging acknowledgement serves to acknowledge receipt of the paging message as well as to initiate access of the system since the terminal is in the SLEEP state. The terminal may thereafter exchange signaling with the base station, if applicable, to obtain additional paging information and/or to perform an action indicated by the paging message.

The paging indicator, paging messages, and paging acknowledgements may be sent in various manners. For clarity, specific formats and transmission schemes for the paging indicator, paging messages, and paging acknowledgements are described below for the exemplary OFDMA system described above and the signal structure shown in FIG. 2.

In general, the paging indicator may comprise any number of bits for any types of information. In an embodiment, the paging indicator comprises N indicator bits and L extension bits, where in general N≥1 and L≥0. The N indicator bits are for N groups of terminals, one indicator bit for each group of terminals. The indicator bits may also be referred to as mask bits or some other terminology. The terminal groups may also be referred to as primary monitoring groups or some other terminology. Each indicator bit indicates whether any terminal in the associated primary monitoring group is being paged in the upcoming paging interval. The L extension bits may be used to convey additional information. In an embodiment, the N indicator bits are further associated with N paging channel segments, one paging channel segment for each indicator bit. In this embodiment, there is a one-to-one mapping between indicator bit, primary monitoring group, and paging channel segment. Each paging channel segment may carry a paging message for a terminal in the associated primary monitoring group or possibly another primary monitoring group.

Figure 5:
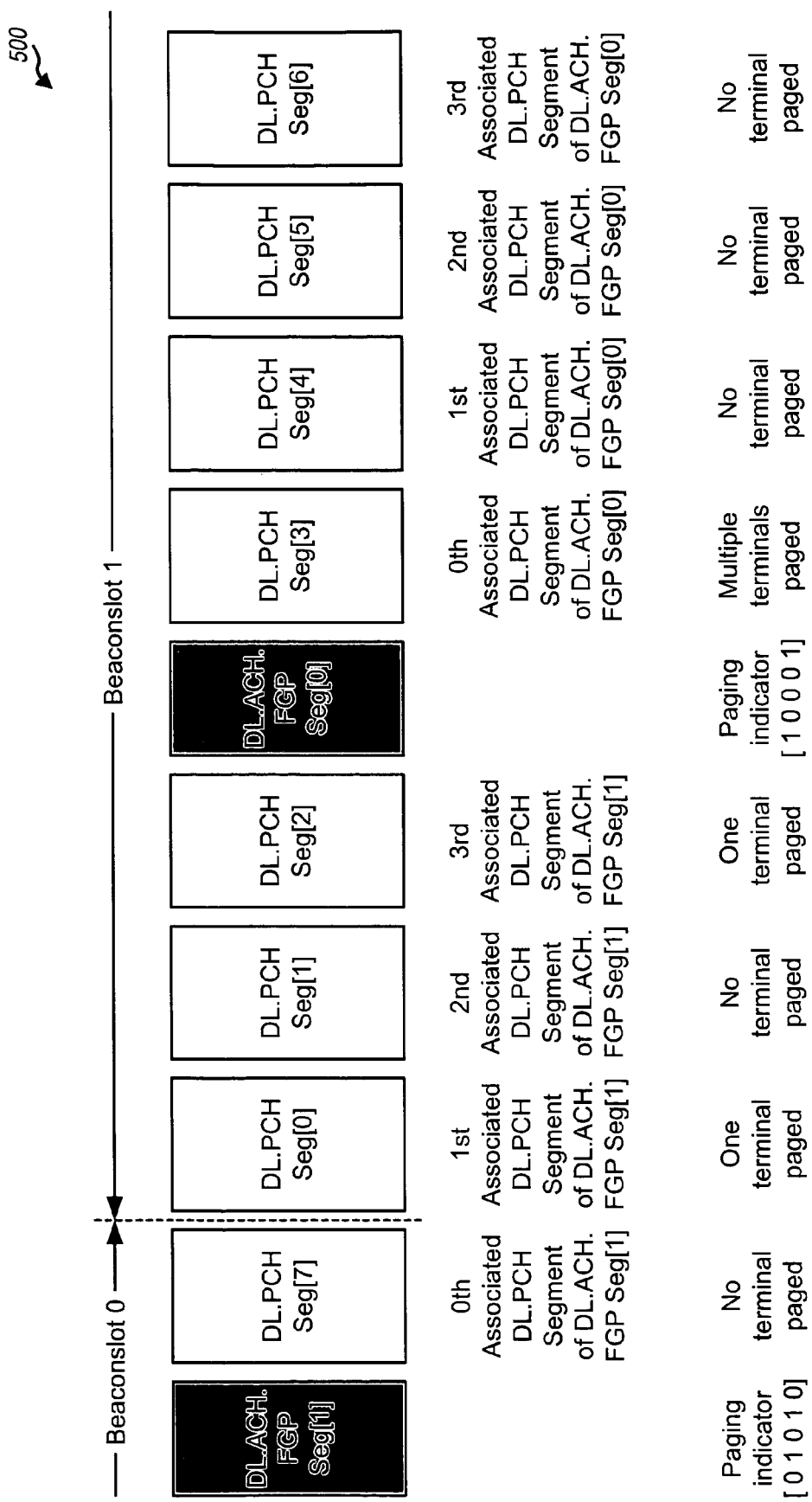
FIG. 5 shows a transmission scheme for a downlink broadcast flash paging channel (DL.BCH.FPG) and a downlink paging channel (DL.PCH).

FIG. 5 shows an embodiment of a transmission scheme 500 for the DL.BCH.FPG and DL.PCH in one beaconslot. In this embodiment, N=8, and eight indicator bits 0 through 7 are sent for eight primary monitoring groups 0 through 7, respectively. The DL.BCH.FPG is sent in two segments that are denoted as DL.BCH.FPG Seg[0] and DL.BCH.FPG Seg[1]. Each DL.BCH.FPG segment carries four indicator bits for four primary monitoring groups. The DL.PCH is sent in eight segments that are denoted as DL.PCH Seg[0] through DL.PCH Seg[7]. Each DL.PCH segment may carry a paging message for a terminal. The two DL.BCH.FPG segments and eight DL.PCH segments may be sent in the order shown in FIG. 5. The duration of each segment is not drawn to scale in FIG. 5.

In an embodiment, DL.PCH Seg[0], DL.PCH Seg[1], ..., DL.PCH Seg[7] are located in superslots 0, 1, ..., 7, respectively, of a given beaconslot. Furthermore, DL.BCH.FPG Seg[0] is located in the same superslot as DL.PCH Seg[3], and DL.BCH.FPG Seg[1] is located in the same superslot as DL.PCH Seg[7].

Table 1 shows an embodiment of the format of the two DL.BCH.FPG segments. In this embodiment, each DL.BCH.FPG segment carries four indicator bits and one extension bit. DL.BCH.FPG Seg[0] carries indicator bits for primary monitoring groups 3, 4, 5 and 6. DL.BCH.FPG Seg[1] carries indicator bits for primary monitoring groups 0, 1, 2 and 7. The four indicator bits of each DL.BCH.FPG segment are also referred to as mask[0] through mask[3].

TABLE 1

DL.BCH.FPG Segment

| DL.BCH.FPG Seg[0] | DL.BCH.FPG Seg[1] | Parameter | Definition |
| --- | --- | --- | --- |
| Indicator bit 3 | Indicator bit 7 | Mask[0] | Mask[k] is set to '1' if at least one terminal in the primary monitoring group of the k-th associated DL.PCH segment is paged and is set to '0' otherwise, for k = 0, 1, 2, 3. |
| Indicator bit 4 | Indicator bit 0 | Mask[1] | |
| Indicator bit 5 | Indicator bit 1 | Mask[2] | |
| Indicator bit 6 | Indicator bit 2 | Mask[3] | |
| Extension bit | Extension bit | Extension | Set to '1' if multiple terminals in at least one primary monitoring group is paged and set to '0' if at most one terminal in each group is paged. |

As shown in FIG. 5, each DL.BCH.FPG segment has four associated DL.PCH segments, with the k-th associated DL.PCH segment being sent k superslots subsequent to the DL.BCH.FPG segment, for k=0, 1, 2, 3. For DL.BCH.FPG Seg[0], DL.PCH Seg[3] through DL.PCH Seg[6] are the 0th through 3rd associated DL.PCH segments, respectively, and are sent 0 through 3 superslots subsequent to DL.BCH.FPG Seg[0]. For DL.BCH.FPG Seg[1], DL.PCH Seg[7] and DL.PCH Seg[0] through DL.PCH Seg[2] are the 0th through 3rd associated DL.PCH segments, respectively, and are sent 0 through 3 superslots subsequent to DL.BCH.FPG Seg[1]. In the embodiment shown in FIG. 5, DL.BCH.FPG Seg[0] and its four associated DL.PCH segments are sent in the same beaconslot whereas DL.BCH.FPG Seg[1] and its four associated DL.PCH segments are sent in two consecutive beaconslots.

In an embodiment, the terminal is assigned a paging cycle (wtPagingCycle) and a paging phase (wtPagingPhase). The paging cycle determines how often the terminal receives the DL.BCH.FPG and ranges from 1 to 144 beaconslots. Preferably, wtPagingCycle is a factor of 144. The paging phase determines the "relevant" DL.BCH.FPG and DL.PCH segments of the terminal and ranges from 0 to 1151. The relevant DL.PCH segments are DL.PCH segments in which the terminal may receive paging messages from the system and may be determined as follows. First, three numbers X1, X2 and X3 are computed, for j=0 to (144/wtPagingCycle−1), as follows:

$X1 = \text{wtPagingPhase} \bmod 8,$ $\text{tmp} = [\text{floor}(\text{wtPagingPhase}/8) \bmod \text{wtPagingCycle}] + j \times \text{wtPagingCycle},$ $X2 = \text{tmp} \bmod 18,$ and $X3 = \text{floor}(\text{tmp}/18) \bmod 8,$  Eq (1)

where mod denotes a modulo operation.

The relevant DL.PCH segments of the terminal are DL.PCH segments sent in ultraslots with index X3, beaconslots with index X2, and superslots with index X1. The terminal has at most one relevant DL.PCH segment in any given beaconslot and one relevant DL.PCH segment in every wtPagingCycle beaconslot. Equation set (1) shows an exemplary scheme for determining the relevant DL.PCH segments of the terminal. The relevant DL.PCH segments may also be determined in other manners and/or based on other inputs such as, e.g., an identifier of the terminal, a pseudo-random number, and so on.

The paging cycle and the paging phase determine the relevant DL.PCH segments in which the terminal might receive paging messages. The relevant DL.BCH.FPG segments of the terminal are DL.BCH.FPG segments with which the relevant DL.PCH segments are associated. The paging indicator for the terminal is sent in the relevant DL.BCH.FPG segments. Multiple terminals may share the same relevant DL.PCH segment in a given beaconslot. The set of terminals having the same relevant DL.PCH segment is called the primary monitoring group of that DL.PCH segment.

In an embodiment, each DL.PCH segment carries at most one paging message for one terminal. Multiple terminals in a primary monitoring group may be paged. In this case, the extension bit of the DL.BCH.FPG segment for that primary monitoring group may be set to '1', and the paging messages for these multiple terminals may be sent in the DL.PCH segment for that group as well as the DL.PCH segments for other groups with no terminals being paged. The extension bit in the DL.BCH.FPG segment thus indicates whether paging messages for the terminals being paged are sent only in their relevant DL.PCH segments or in other associated DL.PCH segments also. The extension bit supports sharing of the DL.PCH segments among the primary monitoring groups whenever necessary and allows for better utilization of the radio resources allocated for the DL.PCH. The extension bit may also reduce paging latency in the scenario where multiple terminals in the same group are to be paged.

FIG. 5 also shows two examples of the use of the DL.BCH.FPG and DL.PCH to page terminals. In beaconslot 0, DL.BCH.FPG Seg[1] has mask[0] set to '0', mask[1] set to '1', mask[2] set to '0', mask[3] set to '1', and the extension bit set to '0'. This DL.BCH.FPG segment indicates that one terminal in the primary monitoring group of the 1st associated DL.PCH segment is being paged and one terminal in the primary monitoring group of the 3rd associated DL.PCH segment is also being paged. The terminals in each of these two groups would then receive their relevant DL.PCH segment. The terminals in the primary monitoring groups of the 0th and 2nd associated DL.PCH segments may go back to sleep without receiving their relevant DL.PCH segments.

In beaconslot 1, DL.BCH.FPG Seg[0] has mask[0] set to '1', mask[1] set to '0', mask[2] set to '0', mask[3] set to '0', and the extension bit set to '1'. This DL.BCH.FPG segment indicates that multiple terminals in the primary monitoring group of the 0th associated DL.PCH segment are being paged. The paging messages for these terminals may be sent in any one of the four associated DL.PCH segments. The terminals in this group may then receive all four associated DL.PCH segments. The terminals in the other three primary monitoring groups may go back to sleep without receiving their relevant DL.PCH segments.

Figure 6:
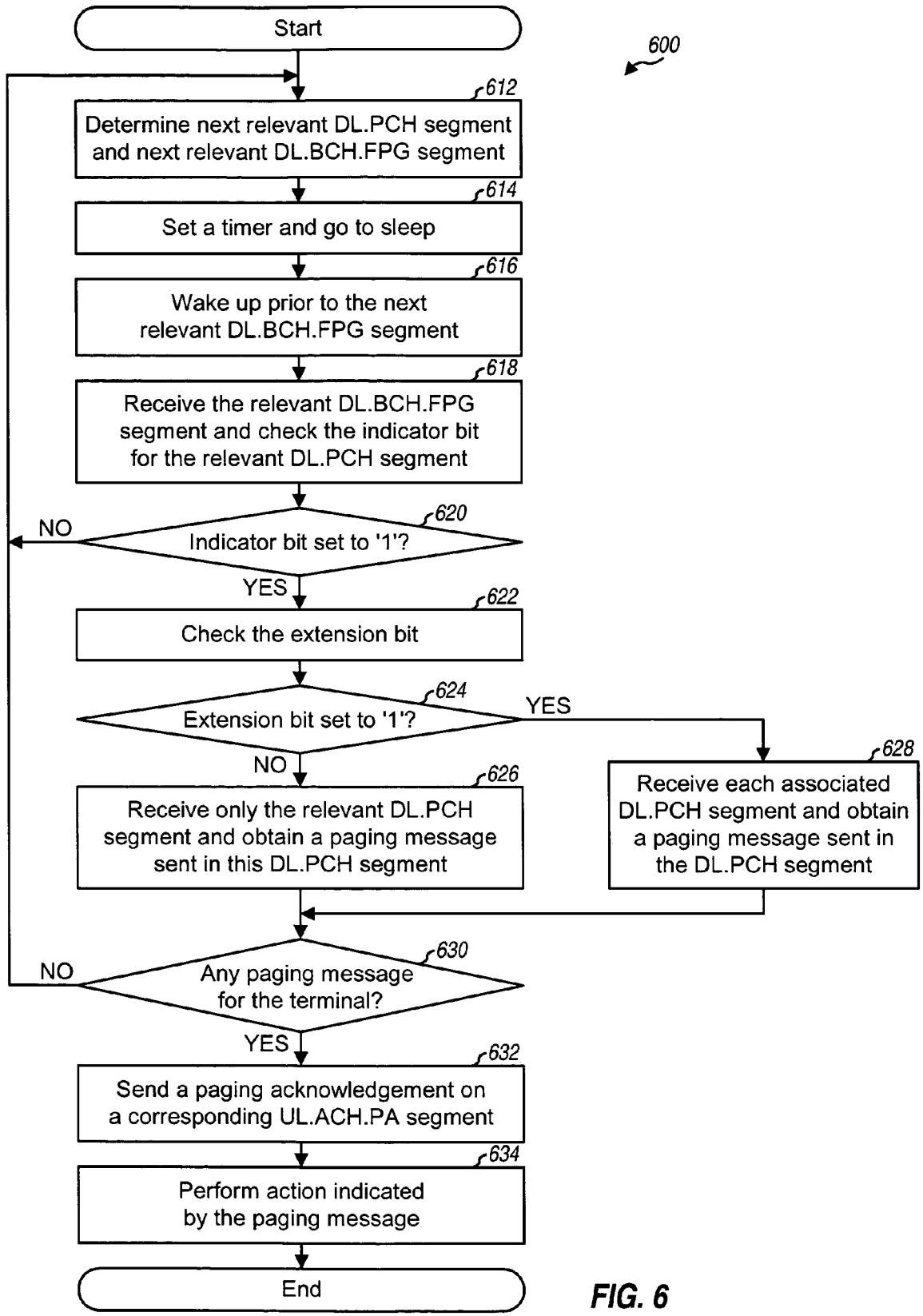
FIG. 6 shows a process to receive paging messages.

FIG. 6 shows an embodiment of a process 600 performed by the terminal to receive paging indicator and paging messages for the DL.BCH.FPG and DL.PCH described above in FIG. 5 and Table 1. The terminal may perform process 600 while in the SLEEP state.

Upon transitioning to the SLEEP state, the terminal determines the next relevant DL.PCH segment and the next relevant DL.BCH.FPG segment, e.g., as described above for equation set (1) (block 612). The terminal then sets a timer that will expire prior to the next relevant DL.BCH.FPG segment and goes to sleep (block 614). The terminal wakes up prior to the next relevant DL.BCH.FPG segment when the timer expires (block 616).

The terminal receives the relevant DL.BCH.FPG segment and checks the indicator bit for the relevant DL.PCH segment (block 618). This indicator bit is mask[k] of the relevant DL.BCH.FPG segment if the relevant DL.PCH segment is the k-th associated DL.PCH segment of this DL.BCH.FPG segment. The terminal then determines whether the indicator bit is set to '1' (block 620). If the indicator bit is set to '0' and the answer is 'No' for block 620, then no terminal in the primary monitoring group to which this terminal belongs is being paged. The terminal then returns to block 612 and sleeps until the next relevant DL.BCH.FPG segment. Otherwise, if the indicator bit is set to '1' and at least one terminal in the primary monitoring group is being paged, then the terminal checks the extension bit of the relevant DL.BCH.FPG segment (block 622).

The terminal then determines whether the extension bit is set to '1' (block 624). If the indicator bit is set to '1' and the extension bit is set to '0', then at most one terminal in the primary monitoring group is being paged. The terminal may then receive only the relevant DL.PCH segment and obtain a paging message sent in this DL.PCH segment (block 626). Otherwise, if the extension bit is set to '1', then multiple terminals in the primary monitoring group are being paged, and multiple paging messages are being sent for these terminals in different DL.PCH segments. The terminal then receives each associated DL.PCH segment and obtains the paging message sent in that DL.PCH segment (block 628). The terminal may stop receiving the DL.PCH segments upon obtaining a paging message for the terminal.

The terminal determines whether any paging message obtained in block 626 or 628 is for the terminal (block 630). If no paging message is for the terminal, then the terminal returns to block 612 and sleeps until the next relevant DL.BCH.FPG segment. Otherwise, if the terminal receives a paging message, then the terminal sends a paging acknowledgement on a corresponding UL.ACH.PA segment (block 632). The terminal then performs the action indicated by the paging message, e.g., access the system, go back to sleep, etc. (block 634).

Table 2 shows an embodiment of the format of a paging message. In this embodiment, a paging message includes two fields/parameters for Paging ID and Paging Format. The Paging ID field carries identification information that identifies the terminal being paged, i.e., the intended recipient of the paging message. The Paging Format field conveys an action to be performed by the paged terminal.

TABLE 2

Paging Message

| Parameter | Size (bits) | Definition |
| --- | --- | --- |
| Paging Format | 4 | 0: instruct the terminal being paged to migrate from the SLEEP state to the ON state<br>1: instruct the terminal to stay in the SLEEP state<br>2-14: reserved<br>15: indicate a null message to be discarded |
| Paging ID | 16 | Carry a paging ID value that is calculated as a function of the Paging Format value and a wtSleepID of the terminal. |

In an embodiment, the Paging ID value may be determined as follows:

Input=0, for ($i=0; i<4; i++$)Input=Input+(Format<<($i*4$)), and $$PGID = UserId \oplus Input, \quad\quad Eq\ (2)$$

where Format is the value of the Paging Format field,
UserId is the wtSleepID of the terminal being paged,
PGID is the value of the Paging ID field, and
$\oplus$ denotes an exclusive OR (XOR) operation.

The wtSleepID is an identifier used to page the terminal. Different terminals are assigned different wtSleepIDs and may thus be individually paged. In equation set (2), the Paging Format value is replicated four times to generate Input. The wtSleepID of the terminal is then XOR'ed with Input to generate PGID. The replication and XOR operations provide coding protection on the Paging Format. In one embodiment, UserId may be dynamically assigned by the system when the terminal is connected and may vary from one connection to another. In another embodiment, UserId is static and does not change from one connection to another.

Equation set (2) shows an exemplary scheme for determining the value of the Paging ID field. The Paging ID value may also be determined in other manners. For example, the Paging ID may simply be set equal to the wtSleepID of the terminal being paged. In general, the Paging ID field contains sufficient information to allow a terminal to determine whether the paging message is for that terminal. This information may be the wtSleepID, the Paging ID, or some other type of ID.

Table 2 shows a specific format for a paging message. This paging message format contains two fields for identification information and an instruction. In general, a paging message may include any number of fields and any type of fields. For example, a paging message may include only the identifier of the terminal being paged. As another example, the paging message may include a field indicating a reason for the page, e.g., an incoming call, an incoming message, an alert for an event, and so on. The user may then elect to respond to the page or ignore the page based on the reason provided by the paging message.

The DL.BCH.FPG, DL.PCH and UL.ACH.PA may be sent in various manners using various transmission schemes, coding and modulation schemes, and so on. Specific embodiments of transmitting the DL.BCH.FPG, DL.PCH and UL.ACH.PA are described below.

The DL.BCH.FPG may be sent in a manner such that the terminals can receive the paging indicator quickly and then return to sleep as fast as possible to maximize power savings. Since the DL.BCH.FPG is sent to all terminals in a cell, a robust coding and modulation scheme may be used for the paging indicator such that even a disadvantaged terminal with the worst-case channel conditions can reliably receive the paging indicator. For clarity, a specific embodiment of transmitting the DL.BCH.FPG is described below.

In an embodiment, the paging indicator is processed by a base station using a non-coherent modulation scheme that allows the terminals to quickly and efficiently receive the paging indicator using non-coherent detection. Non-coherent detection refers to detection of received data or signaling without using a channel estimate of a communication channel via which the data or signaling was sent. Non-coherent detection may greatly reduce the amount of time needed to receive the paging indicator since the terminals may simply receive and process the OFDM symbol(s) carrying the paging indicator without having to derive a channel estimate, which typically requires some amount of time. The terminal does not need to receive additional OFDM symbols, e.g., OFDM symbols preceding the OFDM symbol(s) actually carrying the paging indicator.

Various non-coherent modulation schemes may be used for the paging indicator. For clarity, a specific non-coherent modulation scheme is described below for the paging indicator embodiment shown in Table 1. For this non-coherent modulation scheme, the five bits of a DL.BCH.FPG segment may be given in a row vector u, as follows:

$$u = [u0\ u1\ u2\ u3\ u4], \quad\quad Eq\ (3)$$

where u0 through u3 correspond to mask[0] through mask[3] and u4 corresponds to the extension bit of the DL.BCH.FPG segment.

A 7×3 matrix $u_{21}$ may be defined based on the five bits in vector u, as follows:

$$u_{21} = \begin{bmatrix} u0 & u2 & u4 \\ u1 & u3 & u4 \\ u0 & u1 & u4 \\ u1 & u2 & u3 \\ u0 & u2 & u3 \\ u1 & u3 & u4 \\ u0 & u2 & u4 \end{bmatrix} \quad\quad Eq\ (4)$$

A 3×8 generator matrix $G_{3,8}$ may be defined as follows:

$$G_{3,8} = \begin{bmatrix} 1 & 1 & 1 & 1 & 0 & 0 & 0 & 0 \\ 1 & 1 & 0 & 0 & 1 & 1 & 0 & 0 \\ 1 & 0 & 1 & 0 & 1 & 0 & 1 & 0 \end{bmatrix}. \quad\quad Eq\ (5)$$

The code bits for the paging indicator may then be generated as follows:

$$P_{7,8} = u_{21} \cdot G_{3,8} \quad\quad Eq\ (6)$$

where $P_{7,8}$ is a 7×8 matrix containing seven 8-bit codewords in seven rows. Each codeword in $P_{7,8}$ is generated based on one row of matrix $u_{21}$ and all eight columns of matrix $G_{3,8}$. A 56-bit codeword is then formed by concatenating the seven 8-bit codewords in matrix $P_{7,8}$, with the 8 most significant bits (MSBs) of the 56-bit codeword coming from the first row of $P_{7,8}$, the next 8 MSBs coming from the second row of $P_{7,8}$, and so on. The 56 code bits in the 56-bit codeword are mapped to 56 modulation symbols using BPSK.

In an embodiment, the 56 modulation symbols for the paging indicator of the DL.BCH.FPG segment are sent on 56 tones in one OFDM symbol. The OFDM symbol may be generated as described above. Different sets of 56 tones may be used for the DL.BCH.FPG in different superslots to achieve frequency diversity. The specific set of tones to use for the DL.BCH.FPG in a given superslot may be determined based on a mapping scheme. In an embodiment, the OFDM symbol for DL.BCH.FPG Seg[0] is sent in symbol period 0 of the header for superslot 3, and the OFDM symbol for DL.BCH.FPG Seg[1] is sent in symbol period 0 of the header for superslot 7.

The terminal may wake up prior to a relevant DL.BCH.FPG segment, warm up the receiver and other circuitry, and digitalize a received signal for the OFDM symbol carrying the paging indicator. The terminal may then perform a fast Fourier transform (FFT) on the samples of the OFDM symbol to obtain frequency-domain symbols and may perform non-coherent detection on the frequency-domain symbols to obtain detected paging indicator. For non-coherent detection, the terminal utilizes only the frequency-domain symbols in the OFDM symbol carrying the paging indicator and does not need to utilize any preceding OFDM symbols. From the received frequency-domain symbols, the terminal takes the 56 modulation symbols that correspond to the transmitted codeword. The terminal can decode the 3 bits in the first row of $u_{21}$, which are u0, u2, u4 in equation (4), from the first 8 modulation symbols, e.g., using a maximum likelihood algorithm for the $G_{3,8}$ matrix. The terminal can decode the bits in each of the remaining rows of $u_{21}$, using the remaining modulation symbols.

Transmission of the DL.BCH.FPG segment in one OFDM symbol, which may be approximately 0.1 milliseconds (ms) in duration, allows the terminal to quickly capture the data of interest. The use of non-coherent modulation for the paging indicator allows the terminal to quickly process the data of interest without having to derive a channel estimate. The terminal may thus quickly and efficiently receive the DL.BCH.FPG segment and determine whether it can go back to sleep or proceed to receive one or more associated DL.PCH segments.

The DL.PCH may be sent in various manners such that the terminals can reliably receive the paging messages. The paging messages may be encoded using various coding schemes that may include a block code, a convolutional code, an error detection code, some other codes, or a combination thereof. The paging messages may also be mapped to tones and symbol periods in various manners. For clarity, a specific embodiment of transmitting the DL.PCH is described below.

In an embodiment, a 20-bit paging message shown in Table 2 is encoded with a low-density parity-check (LDPC) code, which is one type of block code, to generate 112 code bits. The LDPC code may be selected in a manner known in the art. The LDPC code may accept a predetermined number of input bits (e.g., 32 bits) and may generate a predetermined number of output bits (e.g., 176 bits). In this case, the 20 bits of the paging message may be padded with a sufficient number of zeros to obtain the required number of input bits, and a sufficient number of output bits (e.g., 64 least significant bits) may be punctured or deleted to obtain the desired number of code bits.

The 112 code bits for the paging message are mapped to 56 modulation symbols using QPSK. In an embodiment, the 56 modulation symbols are sent on eight tones in seven symbol periods of one halfslot. Each beaconslot includes 128 halfslots with indices 0 through 127. Each DL.PCH segment may be sent in one halfslot within the superslot in which that DL.PCH segment is sent. In an embodiment, DL.PCH Seg[s] is sent in halfslot 16×s+13, where s is a DL.PCH segment index and s=0, . . . , 7. Each DL.PCH segment is thus sent on a designated set of tones in a known halfslot. The paging message is sent over a halfslot to achieve time and frequency diversity.

The UL.ACH.PA may be sent in various manners such that a base station can reliably detect the paging acknowledgement and, if applicable, to estimate the timing of the terminal that transmits the paging acknowledgement. In an embodiment, each DL.PCH segment carries at most one paging message for a specific terminal and has a corresponding UL.ACH.PA segment. In this embodiment, only the paged terminal would send a paging acknowledgement on the corresponding UL.ACH.PA segment. Therefore, there is no contention for the UL.ACH.PA segment. In particular, new terminals that desire to access the system are not allowed to use the UL.ACH.PA segment for random access. Advantageously, the paged terminal can access the system with small (minimum) delay. Furthermore, the delay from the paging message to the acknowledgment is deterministic, and the base station can know whether the paging message has been delivered successfully. If an acknowledgement is not received, then the base station can determine whether to retransmit the paging message. Hence, the retransmission latency for the page is small.

In comparison, in a prior art system, there is no dedicated acknowledgment associated with the paging message. After the paging message is sent, the base station usually sets a timer and waits for the paged terminal to access the system. Because the access is random access, the timer is usually large. Upon the expiration of the timer, the base station may retransmit the paging message. Because the timer is large, the retransmission latency can be significant.

In contrast, with the paging techniques described herein, after the base station sends the paging message, the base station receives the corresponding UL.ACH.PA segment for the acknowledgement. If the base station does not receive the acknowledgment, the base station may consider the paging message lost, and may retransmit the paging message in a subsequent paging period.

The base station knows a priori the identity of the terminal transmitting on the corresponding UL.ACH.PA segment. Hence, the paging acknowledgement does not need to carry any information that is specific to the transmitting terminal and may be designed to support other functions such as, e.g., timing estimation. For clarity, a specific embodiment of transmitting the UL.ACH.PA is described below.

In an embodiment, a paging acknowledgement is sent with two waveforms on eight tones in four symbol periods. A first waveform is generated for a first set of eight tones in the first two symbol periods. A second waveform is generated for a second set of eight tones in the last two symbol periods. Different sets of tones may be used for the two waveforms to achieve frequency diversity. For example, the first set may include tones 48 to 55, and the second set may include tones 104 to 111 among the 113 usable tones in the OFDMA system.

Figure 7:
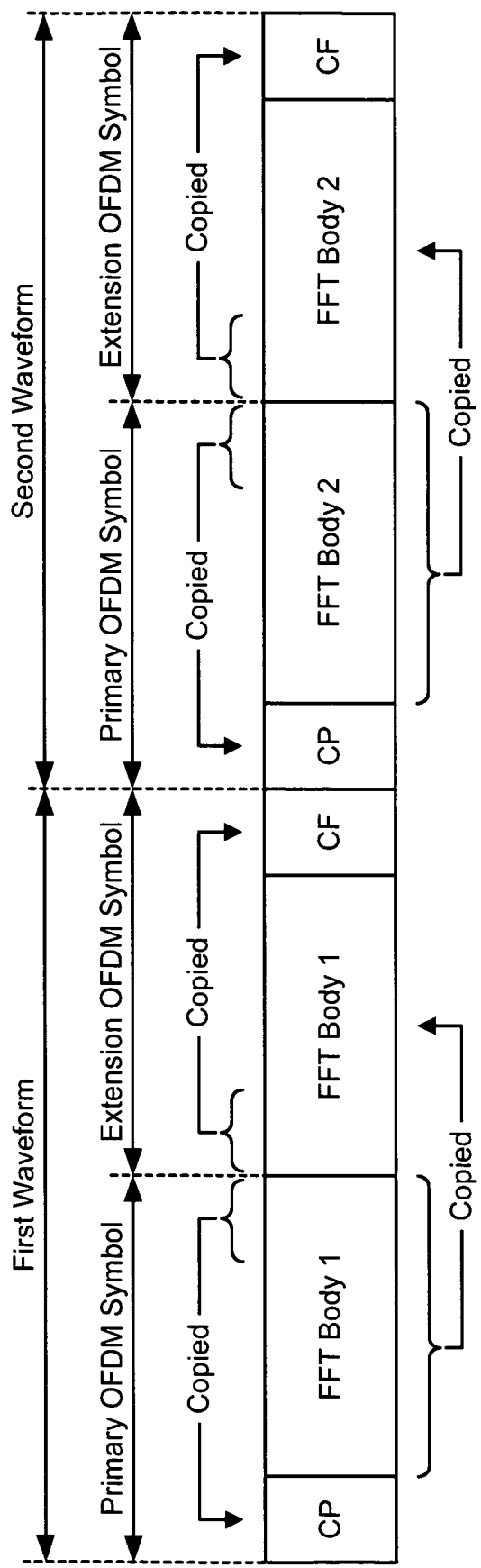
FIG. 7 shows exemplary waveforms for a paging acknowledgement.

FIG. 7 shows an embodiment of the two waveforms for the paging acknowledgement. Each waveform is composed of a primary OFDM symbol followed by an extension OFDM symbol. The primary OFDM symbol may be generated by (1) mapping eight modulation symbols (e.g., QPSK symbols of (1,1)) onto the eight tones used for the waveform, (2) mapping zero symbols onto the remaining tones, (3) performing a 128-point IFFT on the modulation symbols and zero symbols to obtain an FFT body with 128 time-domain samples, and (4) appending a cyclic prefix (CP) by copying the last 16 samples of the FFT body to the start of the FFT body. The extension OFDM symbol may be generated by (1) copying the FFT body of the primary OFDM symbol and (2) appending a cyclic postfix (CF) by copying the first 16 samples of the FFT body to the end of the FFT body. The first and second waveforms have different FFT bodies if different sets of tones are used for these waveforms. In an embodiment, the first waveform for the paging acknowledgement is sent on the uplink in symbol periods 0 and 1 and the second waveform is sent in symbol periods 2 and 3 of the UL.ACH in the uplink superslot following the downlink superslot in which the paging message was received. Symbols periods 4, 5, 6, and 7 of the UL.ACH are left unused.

The waveforms shown in FIG. 7 are designed to accommodate a terminal that is not timing synchronized with the system. In particular, because the terminal is not timing synchronized yet, there is a round-trip delay ambiguity between the terminal and the system. The unused symbol periods 4 to 7 function as a guard time to absorb the round-trip delay ambiguity. Moreover, the primary and extension OFDM symbols maintain phase continuity over two OFDM symbol periods, therefore simplifying the receiver signal processing at the base station.

FIG. 7 shows specific waveforms for the paging acknowledgement. These waveforms allow the base station to estimate the timing, channel gain, and/or other characteristics of the terminal transmitting the waveforms. The base station may send a timing control message to adjust the timing of the terminal. The base station may also send a power control message to adjust the transmit power of the terminal. The timing and/or power control message may be sent as an access grant message to indicate that the terminal has been admitted to the active state of the system. After the terminal is in the active state, the terminal may receive additional paging information, e.g., with traffic and/or control channels.

Other waveforms may also be used for the paging acknowledgement. In another embodiment, a single waveform composed of four OFDM symbols is sent in four symbol periods. In general, any number of waveforms may be generated for any number of sets of tones and may be sent in any number of symbol periods.

Figure 8A:
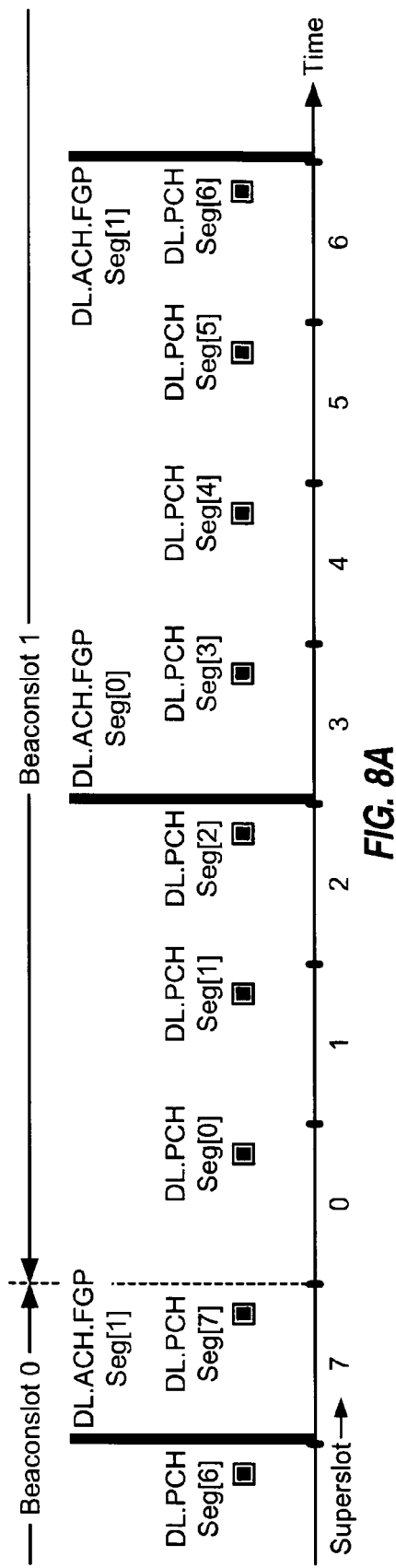
FIGS. 8A and 8B show transmission of paging indicator and paging messages on the downlink and paging acknowledgement on the uplink.

FIG. 8A shows transmission of the DL.BCH.FPG and DL.PCH in accordance with the embodiments described above. In FIG. 8A, the horizontal axis represents time or symbol periods, and the vertical axis represents frequency or tones. The DL.BCH.FPG is sent in superslots 3 and 7 of each beaconslot. DL.BCH.FPG Seg[0] is sent on 56 tones taken from across the 113 usable tones in symbol period 0 of superslot 3. DL.BCH.FPG Seg[1] is sent on 56 tones in symbol period 0 of superslot 7. The DL.PCH is sent in all eight superslots of each beaconslot. DL.PCH Seg[s] is sent on a block of 8 tones by 7 symbol periods in the 13th halfslot of superslot s, for s=0, . . . , 7. This time-frequency block may be partitioned into multiple rectangles (not shown in FIG. 8A).

Figure 8B:
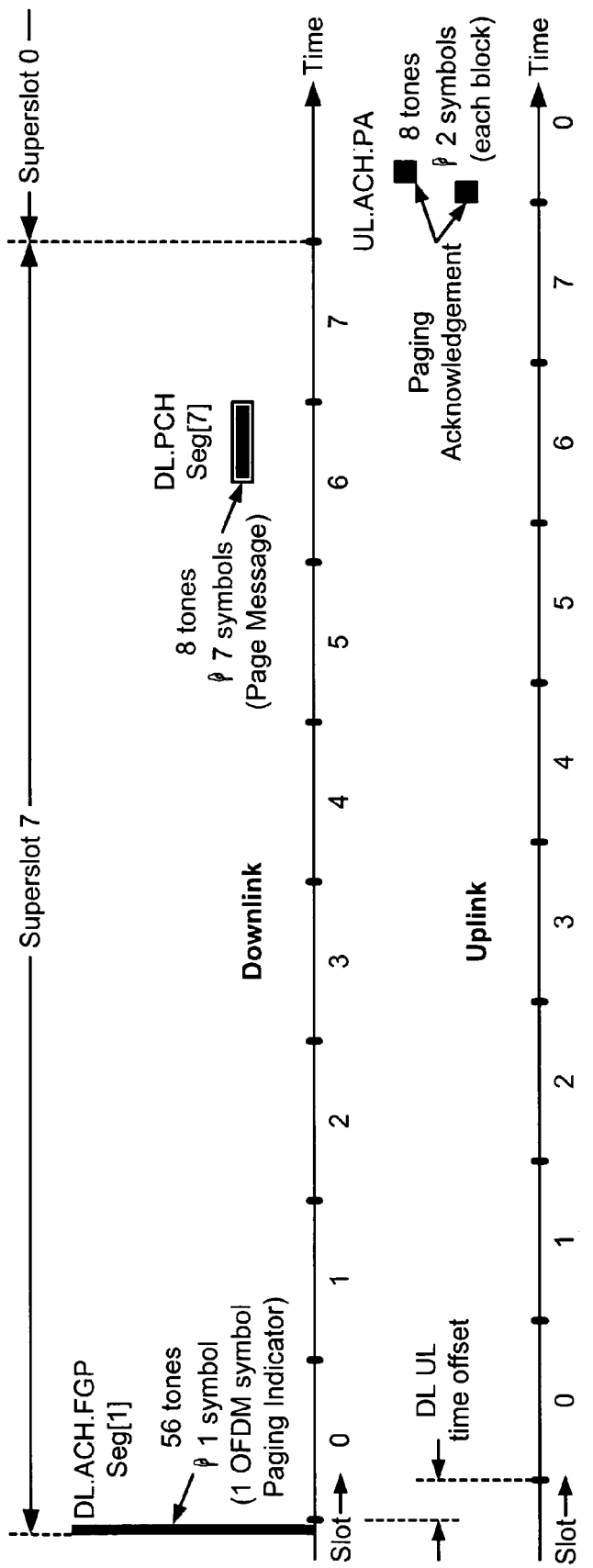

FIG. 8B shows transmission of the DL.BCH.FPG, DL.PCH and UL.ACH.PA in one superslot for the embodiments described above. A DL.BCH.FPG segment is sent in a block of 56 tones by 1 symbol at the start of the superslot. A DL.PCH segment is sent in a block of 8 tones by 7 symbols in the second halfslot of slot 6. A UL.ACH.PA segment is sent in two blocks, each of 8 tones by 2 symbols, in the first four symbol periods of the next uplink superslot.

Specific embodiments of the DL.BCH.FPG, DL.PCH and UL.ACH.PA have been described above. These channels may also be sent in other manners. For example, one indicator bit may be sent followed by a DL.PCH segment instead of four indicator bits followed by four DL.PCH segments. The DL.BCH.FPG and DL.PCH may use other framing formats than the formats shown in Tables 1 and 2, respectively. For example, the DL.BCH.FPG may carry only the indicator bits for the primary monitoring groups. Each paging message may include an extension bit to indicate whether the terminals in the associated primary monitoring group should check a predetermined number of (e.g., three) subsequent DL.PCH segments for paging messages for these terminals. The paging messages may include limited information (e.g., as shown in Table 2) or may include different and/or additional information (e.g., a reason for the page). The paging acknowledgements may include some information, e.g., a single bit indicating whether the terminal intends to respond to the page or go back to sleep.

The DL.BCH.FPG, DL.PCH and UL.ACH.PA may also be encoded and modulated in other manners. For example, the bits of each DL.BCH.FPG segment may be encoded and sent independently instead of jointly as described above. As another example, non-coherent modulation may also be used for the DL.PCH to allow the terminals to quickly process this channel.

The DL.BCH.FPG, DL.PCH and UL.ACH.PA may also be sent on other tones and/or symbol periods. For example, a DL.BCH.FPG segment may be sent in multiple symbol periods, which may be spaced apart, to achieve time diversity. The DL.PCH segments may be sent closer to their associated DL.BCH.FPG segments to allow the terminals to receive the paging messages quicker and to possibly go to sleep earlier. The UL.ACH.PA may be sent with other waveforms than the ones shown in FIG. 7.

In general, the DL.BCH.FPG, DL.PCH and UL.ACH.PA may be sent using various formats, coding and modulation schemes, waveforms, periodicity, tones, symbol periods, and so on. Each channel may be sent in a manner to achieve the desired functions and goals.

The DL.BCH.FPG, DL.PCH and UL.ACH.PA may be used together to quickly and efficiently page terminals while maximizing power savings for these terminals. Paging may also be performed using a subset of these channels. For example, the DL.BCH.FPG and DL.PCH may be used to page the terminals, which may acknowledge pages via some other mechanisms, e.g., by accessing the system through random access, in which case no reserved UL.ACH.PA segment is used. The DL.PCH and UL.ACH.PA may also be used without the DL.BCH.FPG. In this case, the terminals may receive their relevant DL.PCH segments without checking the DL.BCH.FPG.

The paging techniques described herein may also be used for other purposes. For example, multicast and/or broadcast indicator bits may be sent using non-coherent modulation in similar manner as the paging indicator. These multicast and/or broadcast indicator bits may indicate whether multicast and/or broadcast information is being sent in an upcoming interval.

The paging techniques described herein may provide various advantages. The DL.BCH.FPG and DL.PCH described above may reduce signal processing requirement for the terminal to monitor for pages. The DL.BCH.FPG may carry one OFDM symbol of paging indicator and may be quickly received. The paging indicator indicates whether the terminals should process the DL.PCH or can go back to sleep. Since pages are typically sent infrequently, the terminals usually receive only the paging indicator. Sending small paging indicator and limited information in the paging messages allows the DL.BCH.FPG and DL.PCH to be sent using less radio resources. Efficient operation of the DL.BCH.FPG and DL.PCH allows these channels to be sent more frequently (e.g., every beaconslot of less than 100 ms) to achieve fast page response while utilizing a small percentage of the total available radio resources. The paging acknowledgements allow the base stations to determine with fixed and negligible latency whether the paging messages have been successfully delivered. This helps to improve paging reliability.

FIG. 9 shows an embodiment of a process 900 for receiving paging indicator. A terminal receives paging indicator sent by a base station using non-coherent modulation (block 912). The terminal performs non-coherent detection on the received paging indicator, e.g., without deriving a channel estimate of a communication channel via which the paging indicator is received (block 914). The terminal may receive an OFDM symbol carrying the paging indicator, perform an FFT on the received OFDM symbol to obtain frequency-domain symbols, and perform non-coherent detection on the frequency-domain symbols to obtain detected paging indicator. In general, the non-coherent detection is performed in a manner that is complementary to the non-coherent modulation performed by the base station. The terminal determines whether to receive a paging message based on the detected paging indicator (block 916). The terminal may perform coherent detection for the paging message if the detected paging indicator indicates to receive the paging message.

FIG. 10 shows an embodiment of an apparatus 1000 for receiving paging indicator. Apparatus 1000 includes means for receiving paging indicator sent by a base station using non-coherent modulation (block 1012), means for performing non-coherent detection on the received paging indicator (block 1014), and means for determining whether to receive a paging message based on detected paging indicator (block 1016).

Figures 11, 12:
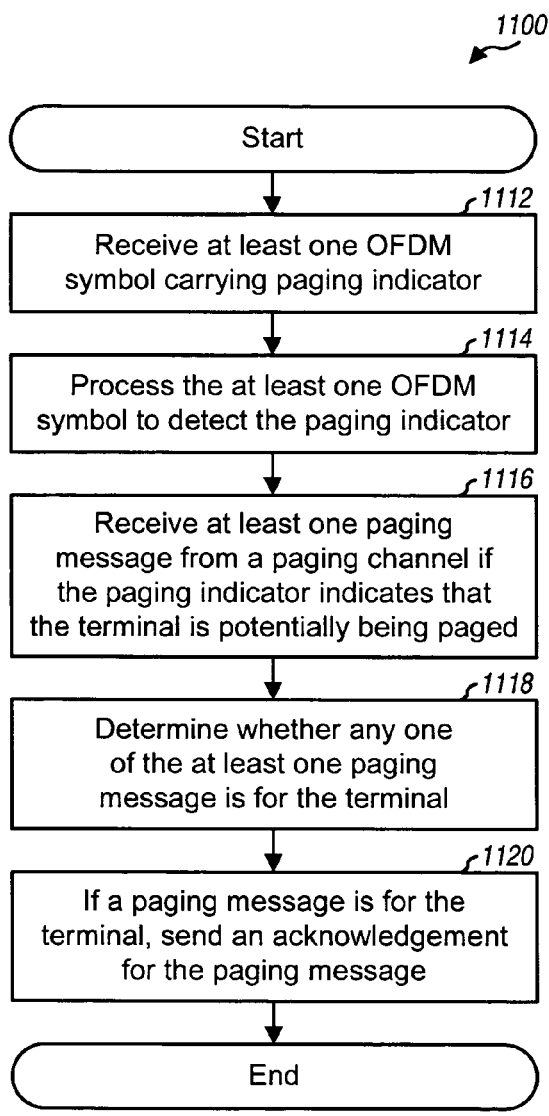
FIG. 11 shows a process to receive paging indicator and paging message.
FIG. 12 shows an apparatus to receive paging indicator and paging message.

FIG. 11 shows an embodiment of a process 1100 for receiving paging indicator and paging messages. A terminal receives at least one OFDM symbol carrying paging indicator from a base station (block 1112). The terminal processes the at least one OFDM symbol to detect the paging indicator (block 1114). The terminal receives at least one paging message from a paging channel if the paging indicator indicates that the terminal is potentially being paged (block 1116). The terminal determines whether any one of the at least one paging message is for the terminal, e.g., based on identification information included in each paging message (block 1118). If a paging message is for the terminal, then the terminal sends an acknowledgement for the paging message (block 1120).

The paging indicator may comprise one or multiple indicator bits for one or multiple groups of terminals, one indicator bit for each group of terminals. Each indicator bit may indicate whether at least one terminal in the associated group of terminals is being paged. The paging indicator may also comprise an extension bit that indicates whether multiple terminals in at least one group of terminals are being paged. The paging indicator may comprise multiple indicator bits that may be associated with multiple segments of the paging channel, one paging channel segment for each indicator bit. Paging messages for the multiple groups of terminals may be sent in the multiple segments of the paging channel. Each paging channel segment may carry, e.g., at most one paging message for one terminal being paged.

The terminal may determine whether an indicator bit applicable to the terminal is set (which indicates that at least one terminal in the terminal's group is being page) and whether the extension bit is set (which indicates that multiple terminals in at least one group are bring page). If only the indicator bit is set, then the terminal may receive only the paging message from the paging channel segment associated with this indicator bit. If both the indicator bit and the extension bit are set, then the terminal may receive paging messages from multiple (e.g., all) paging channel segments.

Each paging message may convey identification information for a terminal being paged, a paging format indicative of an action to be performed by the paged terminal, and so on. If the terminal is being paged, then the terminal may perform the action indicated by the paging format. For example, the terminal may access the system and exchange signaling with the base station to obtain additional information for the paging message.

The paging indicator may be sent in a single OFDM symbol to reduce awake time and may be sent with a short periodicity (e.g., less than 100 ms) to achieve fast paging response. Each paging message may be sent on a respective time-frequency block for the paging channel. The acknowledgement for each paging message may be sent in radio resources (e.g., tones and symbol periods) reserved for sending the acknowledgement and suitable for use by terminals having imprecise timing. The acknowledgement may carry no information specific to the terminal sending the acknowledgement. The terminal may send at least one waveform, with each waveform comprising multiple OFDM symbols having a common body, to convey the acknowledgement. The terminal may receive timing adjustment determined by the base station based on the acknowledgement and may adjust its timing based on the timing adjustment.

FIG. 12 shows an embodiment of an apparatus 1200 for receiving paging indicator and paging messages. Apparatus 1200 includes means for receiving at least one OFDM symbol carrying paging indicator from a base station (block 1212), means for processing the at least one OFDM symbol to detect the paging indicator (block 1214), means for receiving at least one paging message from a paging channel if the paging indicator indicates that the terminal is potentially being paged (block 1216), means for determining whether any one of the at least one paging message is for the terminal (block 1218), and means for, if a paging message is for the terminal, sending an acknowledgement for the paging message (block 1220).

Figure 13:
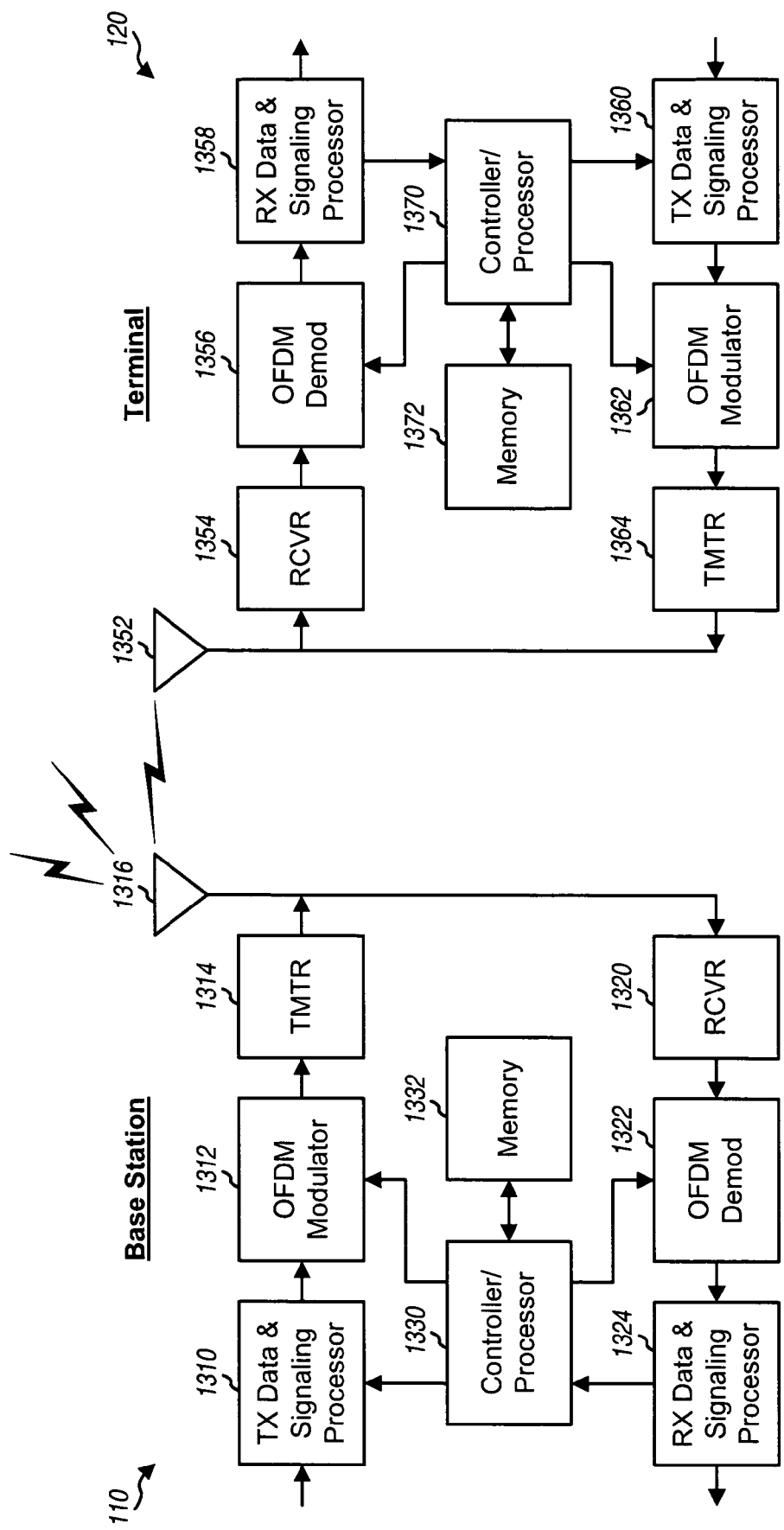
FIG. 13 shows a block diagram of a base station and a terminal.

FIG. 13 shows a block diagram of an embodiment of a base station 110 and a terminal 120 in FIG. 1. At base station 110, a transmit (TX) data and signaling processor 1310 receives traffic data for the terminals being served and signaling (e.g., paging indicator for the DL.BCH.FPG, paging messages for the DL.PCH, timing adjustments, and so on). Processor 1310 processes (e.g., formats, encodes, interleaves, and symbol maps) the traffic data, signaling, and pilot and provides output symbols. An OFDM modulator 1312 performs OFDM modulation on the output symbols and generates OFDM symbols. A transmitter (TMTR) 1314 conditions (e.g., converts to analog, filters, amplifies, and upconverts) the OFDM symbols to generate a downlink signal, which is transmitted via an antenna 1316.

At terminal 120, an antenna 1352 receives downlink signals from base station 110 and other base stations and provides a received signal to a receiver (RCVR) 1354. Receiver 1354 conditions and digitizes the received signal and provides samples. An OFDM demodulator (Demod) 1356 performs OFDM demodulation on the samples and provides frequency-domain symbols for the usable tones. A receive (RX) data and signaling processor 1358 processes (e.g., symbol demaps, deinterleaves, and decodes) the frequency-domain symbols and provides decoded data and signaling for terminal 120. Processor 1358 may perform non-coherent detection of the paging indicator, coherent detection and decoding of the paging messages, and so on. Processor 1358 and/or may a controller/processor 1370 may perform process 900 in FIG. 9.

Controller/processor 1370 receives paging messages from processor 1358, determines whether any paging messages are for terminal 120, and generates paging acknowledgements. A TX data and signaling processor 1360 generates output symbols for traffic data, signaling (e.g., paging acknowledgements), and pilot to be sent to base station 110. An OFDM modulator 1362 performs OFDM modulation on the output symbols and generates OFDM symbols. A transmitter 1364 conditions the OFDM symbols and generates an uplink signal, which is transmitted via antenna 1352.

At base station 110, the uplink signals from terminal 120 and other terminals are received by antenna 1316, conditioned and digitized by a receiver 1320, demodulated by an OFDM demodulator 1322, and processed by an RX data and signaling processor 1324 to recover the traffic data and signaling sent by terminal 120 and other terminals. A controller/processor 1330 may receive paging acknowledgements from terminal 120 and determine timing adjustment for the terminal.

Controllers/processors 1330 and 1370 direct the operation of various processing units at base station 110 and terminal 120, respectively. Controller/processor 1370 may perform process 1100 in FIG. 11 and/or other processes for paging. Memories 1332 and 1372 store program codes and data for base station 110 and terminal 120, respectively.

The paging techniques described herein may be implemented by various means. For example, these techniques may be implemented in hardware, firmware, software, or a combination thereof. For a hardware implementation, the processing units at a terminal or a base station used for paging may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the paging techniques may be implemented with modules (e.g., procedures, functions, and so on) that perform the functions described herein. The firmware and/or software codes may be stored in a memory (e.g., memory 1332 or 1372 in FIG. 13) and executed by a processor (e.g., processor 1330 or 1370). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A terminal comprising:
at least one processor configured to receive at least one orthogonal frequency division multiplexing symbol carrying a paging indicator, to process the at least one orthogonal frequency division multiplexing symbol to detect the paging indicator, to determine whether an indicator bit within the paging indicator is set, to receive at least one paging message from a paging channel when the indicator bit is set, and to send a paging acknowledgement in an uplink paging acknowledgement segment in response to receipt of the paging message followed by a plurality of unused symbol periods within the uplink paging acknowledgement segment; and
a memory coupled to the at least one processor.

2. The terminal of claim 1, wherein the indicator bit indicates whether at least one terminal in an associated group of terminals is being paged.

3. The terminal of claim 2, wherein paging messages for multiple groups of terminals are sent in multiple segments of the paging channel.

4. The terminal of claim 3, wherein each segment of the paging channel carries at most one paging message for one terminal being paged.

5. The terminal of claim 3, wherein one paging message of the at least one paging message is received from a segment of the paging channel associated with the indicator bit.

6. The terminal of claim 1, wherein receiving the at least one paging message from the paging channel comprises receiving multiple paging messages from multiple segments of the paging channel if the indicator bit and an extension bit are set.

7. The terminal of claim 1, wherein each of the at least one paging message comprises identification information for a terminal being paged.

8. The terminal of claim 1, wherein each of the at least one paging message comprises a paging format indicative of an action to be performed by a terminal being paged.

9. The terminal of claim 8, wherein the at least one processor is configured to determine if any one of the at least one paging message is for the terminal and, if a paging message is for the terminal, to perform the action indicated by the paging format of the paging message.

10. The terminal of claim 1, wherein the at least one processor is configured to determine if any one of the at least one paging message is for the terminal and, if a paging message is for the terminal, to send an acknowledgement for the paging message.

11. The terminal of claim 1, wherein the at least one processor is configured to receive a single orthogonal frequency division multiplexing symbol carrying the paging indicator.

12. The terminal of claim 1, wherein the at least one processor is configured to receive each of the at least one paging message from a respective time-frequency block for the paging channel.

13. The terminal of claim 1, wherein the paging indicator is sent at a periodicity of less than 100 milliseconds.

14. A method comprising:
receiving at a terminal at least one orthogonal frequency division multiplexing symbol carrying a paging indicator;
processing the at least one orthogonal frequency division multiplexing symbol to detect the paging indicator;
determining whether an indicator bit within the paging indicator is set;
receiving at least one paging message from the paging channel when the indicator bit is set, and
sending a paging acknowledgement in an uplink paging acknowledgement segment in response to receipt of the paging message followed by a plurality of unused symbol periods within the uplink paging acknowledgement segment.

15. The method of claim 14, wherein one paging message of the at least one paging message is received from a segment of the paging channel associated with the indicator bit.

16. The method of claim 14, wherein the receiving the at least one paging message comprises:
receiving multiple paging messages from multiple segments of the paging channel if the indicator bit and an extension bit are set.

17. The method of claim 14, further comprising:
determining if any one of the at least one paging message is for the terminal; and
if a paging message is for the terminal, sending an acknowledgement for the paging message.

18. An apparatus comprising:
means for receiving at a terminal at least one orthogonal frequency division multiplexing symbol carrying a paging indicator;
means for processing the at least one orthogonal frequency division multiplexing symbol to detect the paging indicator;
means for determining whether an indicator bit within the paging indicator is set;
means for receiving at least one paging message from the paging channel when the indicator bit is set; and
means for sending a paging acknowledgement in an uplink paging acknowledgement segment in response to receipt of the paging message followed by a plurality of unused symbol periods within the uplink paging acknowledgement segment.

19. The apparatus of claim 18, wherein one paging message of the at least one paging message is received from a segment of the paging channel associated with the indicator bit.

20. The apparatus of claim 18, wherein the means for receiving the at least one paging message comprises:
means for receiving multiple paging messages from multiple segments of the paging channel if the indicator bit and an extension bit are set.

21. The apparatus of claim 18, further comprising:
means for determining if any one of the at least one paging message is for the terminal; and
means for, if a paging message is for the terminal, sending an acknowledgement for the paging message.

22. A non-transitory computer-readable medium including instructions stored thereon, the instructions being executable to:
direct reception of at least one orthogonal frequency division multiplexing symbol carrying a paging indicator;
direct processing of the at least one orthogonal frequency division multiplexing symbol to detect the paging indicator;
determine whether an indicator bit within the paging indicator is set;
direct reception of at least one paging message from the paging channel when the indicator bit is set; and
send a paging acknowledgement in an uplink paging acknowledgement segment in response to direct reception of the paging message followed by a plurality of unused symbol periods within the uplink paging acknowledgement segment.

23. A terminal comprising:
at least one processor configured to receive a paging indicator, to determine whether an indicator bit within the paging indicator is set, to receive at least one paging message from a paging channel when the indicator bit is set, to determine whether one of the at least one paging message is for the terminal and, when a paging message is for the terminal, to send a paging acknowledgement in an uplink paging acknowledgement segment in response to receipt of the paging message followed by a plurality of unused symbol periods within the uplink paging acknowledgement segment; and
a memory coupled to the at least one processor.

24. The terminal of claim 23, wherein the at least one processor is configured to send the acknowledgement for the paging message in radio resources reserved for sending the acknowledgement.

25. The terminal of claim 24, wherein the radio resources comprise at least one designated tone in at least one designated symbol period and are suitable for use by terminals having imprecise timing.

26. The terminal of claim 23, wherein the acknowledgement carries no information specific to the terminal.

27. The terminal of claim 23, wherein the at least one processor is configured to generate at least one waveform, each waveform comprising multiple orthogonal frequency division multiplexing symbols having a common body, and to send the at least one waveform for the acknowledgement.

28. The terminal of claim 23, wherein the at least one processor is configured to receive timing adjustment determined by a base station based on the acknowledgement sent for the paging message, and to adjust timing of the terminal based on the timing adjustment.

29. The terminal of claim 23, wherein the at least one processor is configured to communicate with a base station to obtain additional information for the paging message.

30. The terminal of claim 23, wherein the at least one processor is configured to receive the at least one paging message from the paging channel while in a sleep state and to remain in the sleep state if the paging message for the terminal indicates no further communication.

31. The terminal of claim 30, wherein the at least one processor is configured to migrate to an active state if the paging message for the terminal indicates further communication.

32. A method comprising:
receiving at a terminal a paging indicator;
determining whether an indicator bit within the paging indicator is set;
receiving at the terminal at least one paging message from the paging channel when the indicator bit is set;
determining whether one of the at least one paging message is for the terminal;
and when a paging message is for the terminal, sending a paging acknowledgement in an uplink paging acknowledgement segment in response to receipt of the paging message followed by a plurality of unused symbol periods within the uplink paging acknowledgement segment.

33. The method of claim 32, wherein the sending the acknowledgement comprises
generating at least one waveform, each waveform comprising multiple orthogonal frequency division multiplexing symbols having a common body, and
sending the at least one waveform for the acknowledgement.

34. The method of claim 32, further comprising:
receiving timing adjustment determined by a base station based on the acknowledgement sent for the paging message; and
adjusting timing of the terminal based on the timing adjustment.

35. An apparatus comprising:
means for receiving at a terminal a paging indicator;
means for determining whether an indicator bit within the paging indicator is set;
means for receiving at the terminal at least one paging message from the paging channel when the indicator bit is set;
means for determining whether one of the at least one paging message is for the terminal; and
means for sending a paging acknowledgement in an uplink paging acknowledgement segment in response to receipt of the paging message followed by a plurality of unused symbol periods within the uplink paging acknowledgement segment if a paging message is for the terminal.

36. The apparatus of claim 35, wherein the means for sending the acknowledgement comprises
means for generating at least one waveform, each waveform comprising multiple orthogonal frequency division multiplexing symbols having a common body, and
means for sending the at least one waveform for the acknowledgement.

37. The apparatus of claim 35, further comprising:
means for receiving timing adjustment determined by a base station based on the acknowledgement sent for the paging message; and
means for adjusting timing of the terminal based on the timing adjustment.

38. An apparatus comprising:
at least one processor configured to receive a paging indicator sent using non-coherent modulation, to perform non-coherent detection on the received paging indicator, to determine whether to receive a paging message based on the detected paging indicator, wherein determining whether to receive the paging message comprises determining whether an indicator bit within the paging indicator is set, and to send a paging acknowledgement in an uplink paging acknowledgement segment in response to receipt of the paging message followed by a plurality of unused symbol periods within the uplink paging acknowledgement segment when the paging message is received; and
a memory coupled to the at least one processor.

39. The apparatus of claim 38, wherein the at least one processor is configured to receive the paging indicator via a communication channel and to perform non-coherent detection on the received paging indicator without deriving a channel estimate for the communication channel from at least one preceding symbol.

40. The apparatus of claim 38, wherein the at least one processor is configured to receive an orthogonal frequency division multiplexing symbol carrying the paging indicator, to perform a fast Fourier transform on the received orthogonal frequency division multiplexing symbol to obtain frequency-domain symbols, and to perform non-coherent detection on the frequency-domain symbols to obtain the at least one detected paging indicator.

41. The apparatus of claim 38, wherein the at least one processor is configured to perform coherent detection for the paging message if the detected paging indicator indicates to receive the paging message.

42. A method comprising:
receiving at a terminal a paging indicator sent using non-coherent modulation;
performing non-coherent detection on the received paging indicator;
determining whether to receive a paging message based on the detected paging indicator,
wherein determining whether to receive the paging message comprises determining whether an indicator bit within the paging indicator is set; and
sending a paging acknowledgement in an uplink paging acknowledgement segment in response to receipt of the paging message followed by a plurality of unused symbol periods within the uplink paging acknowledgement segment when the paging message is received.

43. The method of claim 42, wherein the receiving the paging indicator comprises receiving an orthogonal frequency division multiplexing symbol carrying the paging indicator, and wherein the performing non-coherent detection comprises performing a fast Fourier transform on the received orthogonal frequency division multiplexing symbol to obtain frequency-domain symbols, and performing non-coherent detection on the frequency-domain symbols to obtain the detected paging indicator.

44. An apparatus comprising:
means for receiving a paging indicator sent using non-coherent modulation;
means for performing non-coherent detection on the received paging indicator;
means for determining whether to receive a paging message based on the detected paging indicator, wherein the means for determining whether to receive the paging message comprises means for determining whether an indicator bit within the paging indicator is set, and
means for sending a paging acknowledgement in an uplink paging acknowledgement segment in response to receipt of the paging message followed by a plurality of unused symbol periods within the uplink paging acknowledgement segment when the paging message is received.

45. The apparatus of claim 44, wherein the means for receiving the paging indicator comprises means for receiving an orthogonal frequency division multiplexing symbol carrying the paging indicator, and wherein the means for performing non-coherent detection comprises means for performing a fast Fourier transform on the received orthogonal frequency division multiplexing symbol to obtain frequency-domain symbols, and means for performing non-coherent detection on the frequency-domain symbols to obtain the detected paging indicator.

46. An apparatus comprising:
at least one processor configured to send at least one orthogonal frequency division multiplexing symbol carrying a paging indicator indicating whether terminals are potentially being paged, to set an indicator bit within the paging indicator when at least one terminal is being paged, and to send paging messages on a paging channel to terminals being paged, wherein each of the paging messages includes a paging identifier value that is calculated as a function of a paging format value; and
a memory coupled to the at least one processor.

47. The apparatus of claim 46, wherein the at least one processor is configured to receive acknowledgements from the terminals being paged.

48. The apparatus of claim 47, wherein the at least one processor is configured to resend paging messages for which acknowledgements are not received.

49. The apparatus of claim 47, wherein the at least one processor is configured to estimate timing of each of at least one terminal being paged based on an acknowledgement received from the terminal, and to send timing adjustment to each of the at least one terminal.

50. The apparatus of claim 46, wherein the at least one processor is configured to perform non-coherent modulation on the paging indicator to obtain modulation symbols, and to generate the at least one orthogonal frequency division multiplexing symbol for the modulation symbols.

* * * * *